(12) United States Patent
Burr et al.

(10) Patent No.: US 7,378,659 B2
(45) Date of Patent: May 27, 2008

(54) SYSTEMS AND METHODS TO LOCALIZE OPTICAL EMISSION IN RADIATION DETECTORS

(75) Inventors: Kent Charles Burr, Latham, NY (US); James Walter LeBlanc, Niskayuna, NY (US); Adrian Ivan, Niskayuna, NY (US); Donald Earl Castleberry, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 295 days.

(21) Appl. No.: 11/072,361

(22) Filed: Mar. 4, 2005

(65) Prior Publication Data

US 2006/0197022 A1 Sep. 7, 2006

(51) Int. Cl.
*G01T 1/20* (2006.01)

(52) U.S. Cl. .................................... 250/362
(58) Field of Classification Search ........... 250/362
See application file for complete search history.

(56) References Cited

U.S. PATENT DOCUMENTS

| | | | |
|---|---|---|---|
| 5,813,983 A | 9/1998 | DiFilippo et al. | 600/407 |
| 6,194,728 B1 | 2/2001 | Bosnjakovic | 250/370.11 |
| 6,362,479 B1 | 3/2002 | Andreaco et al. | 250/366 |
| 2005/0006589 A1* | 1/2005 | Joung et al. | 250/370.09 |

* cited by examiner

*Primary Examiner*—Christine Sung
(74) *Attorney, Agent, or Firm*—Fletcher Yoder

(57) ABSTRACT

A method for identifying localized optical emission is disclosed. The method involves identifying a region, which corresponds to a plurality of scintillator units of a scintillator, on a position sensitive photodetector that is impacted by one or more photons. The method further involves identifying a readout channel of a pixellated photodetector array that corresponds to a pixel associated with a scintillator unit impacted by the one or more photons. The method, further involves, identifying the scintillator unit based on the region and the readout channel.

22 Claims, 10 Drawing Sheets

SYSTEMS AND METHODS TO LOCALIZE OPTICAL EMISSION IN RADIATION DETECTORS

BACKGROUND

The invention relates generally to the field of non-invasive imaging. More particularly, the invention relates to detectors for use in non-invasive imaging.

In the fields of medical imaging and security screening, non-invasive imaging techniques have gained importance due to benefits that include unobtrusiveness, ease, and speed. A number of non-invasive imaging modalities exist today. Examples include positron emission tomography (PET) imaging, single photon emission computed tomography (SPECT) imaging, magnetic resonance (MR) imaging, ultrasound imaging and X-ray imaging. In medical and research contexts, these imaging systems are used to image organs or tissues beneath the surface of the skin. A particular modality may be selected based upon the organ or tissue to be imaged, upon the spatial and/or temporal resolution desired, or upon whether structural or functional characteristics are of interest.

In PET and SPECT systems an image is generated based upon the impact of radiation photons (generated by a nuclear decay event) against a scintillator. In response to the impact of the radiation photons, the scintillator emits light, which may in turn be detected by optical sensors. For example, the emitted light may be detected using position sensing avalanche photodiodes (PSAPDs) or other photo detector device, such as a photo multiplier tube (PMT). In the example of the PSAPD, timing resolution may be limited by factors such as large capacitance in the PSAPD, low signal to noise ratio, and slow charge collection due to the presence of a resistive layer that facilitates the determination of impact position. For example, large capacitance and series resistance in the PSAPD tend to increase the rise-time associated with a detection event (measured as the slope of the rising edge of the signal) and the reduced signal-to-noise ratio leads to poor timing resolution.

In general, poor timing resolution is not desired. For example, in PET imaging, the timing interval or "window" used to determine that two detection events result from the same decay event must be sufficiently large to accommodate the entire range of timing possibilities for the detector. In some cases it is desirable to reduce the timing interval so that randomly coincident signals may be more easily discarded. However, this reduction may also lead to actual detection events being disregarded due to poor timing resolution of the detector assembly. In particular, the narrower the timing interval, the more likely that signals arising from the same decay event will be discarded simply due to the poor timing resolution of the detector circuitry, i.e., impacts associated with the same decay event may be erroneously determined to not arise from the same decay event. As a result, data that may be useful in forming a diagnostic or other image may be discarded or ignored, leading to less useful and/or lower quality images.

BRIEF DESCRIPTION

In accordance with an exemplary embodiment of the present technique, a method for identifying localized optical emission is disclosed. The method involves identifying a region, which corresponds to a plurality of scintillator units of a scintillator, on a position sensitive avalanche photodiode (PSAPD) that is impacted by one or more photons. The method further involves identifying a readout channel of a pixellated avalanche photodiode (APD) array that corresponds to an APD pixel associated with a scintillator unit impacted by the one or more photons. The method, further involves, identifying the scintillator unit based on the region and the readout channel.

In accordance with another embodiment of the present technique, a detector is disclosed. The detector includes a scintillator array that comprises two or more scintillator units configured to emit optical photons in response to radiation. The detector also includes a pixellated photodiode array, attached to a first surface of the scintillator array, comprising a corresponding photodiode for each of the scintillator units. The detector further includes a position sensitive avalanche photodiode affixed to a second surface of the scintillator array and opposite to the first surface.

In accordance with yet another embodiment of the present technique, an imaging system is disclosed. The imaging system includes a detector assembly that includes an array of detector modules that are configured to detect radiation. Each of the detector modules includes a scintillator array that has two or more scintillator units configured to emit optical photons in response to radiation. Each detector module also includes a pixellated photodiode array, attached to a first surface of the scintillator array, comprising a corresponding photodiode for each of the scintillator units. The detector module further includes a position sensitive avalanche photodiode affixed to a second surface of the scintillator array and opposite to the first surface.

In accordance with yet another embodiment of the present technique, a method of manufacturing a detector module is disclosed. The method involves attaching a position sensitive avalanche photodiode (PSAPD) to a first surface of a scintillator array and attaching a pixellated avalanche photodiode array to a second surface of the scintillator array and where the second surface is opposite the first surface on the scintillator array.

DRAWINGS

These and other features, aspects, and advantages of the present invention will become better understood when the following detailed description is read with reference to the accompanying drawings in which like characters represent like parts throughout the drawings, wherein:

FIG. 3 is an exemplary depiction of one arrangement of data channels for a pixellated APD array;

FIG. 4 is an exemplary depiction of another arrangement of data channels for a pixellated APD array for use in conjunction with the array of FIG. 3 on opposing ends of a scintillator array;

DETAILED DESCRIPTION

Figure 1:
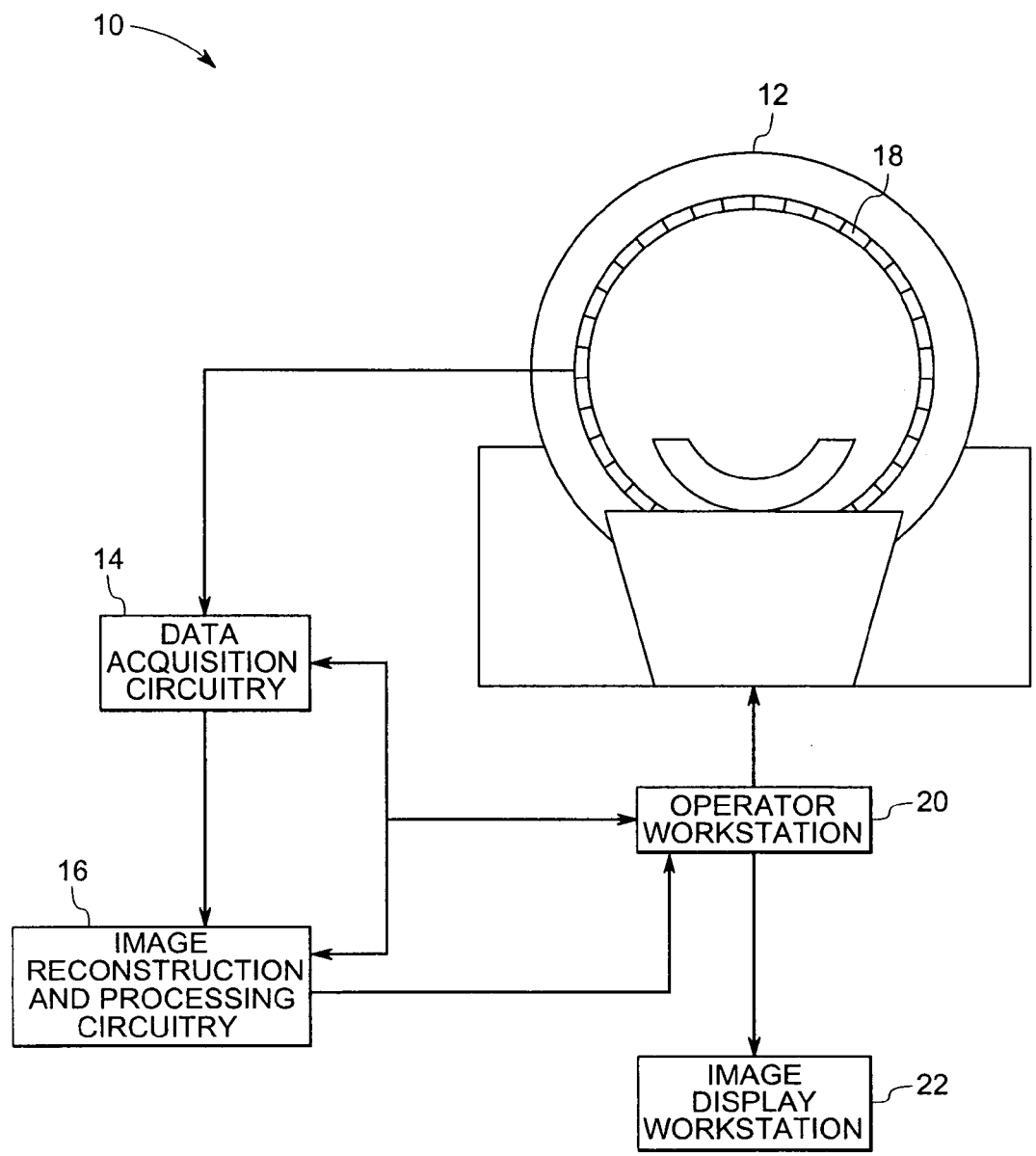
FIG. 1 is a diagrammatical illustration of an exemplary positron emission tomography (PET) imaging system operating, in accordance with one embodiment of the present technique.

Turning now to the drawings and referring first to FIG. 1, an exemplary PET system 10 operating in accordance with certain aspects of the present technique is illustrated. The PET system 10 includes a detector assembly 12, detector acquisition circuitry 14, and image reconstruction and processing circuitry 16. The detector assembly 12 typically includes a number of detector modules (generally designated by reference numeral 18) arranged in one or more rings, as depicted in FIG. 1. The PET system 10 also includes an operator workstation 20 and an image display workstation 22. While in the illustrated embodiment, the detector acquisition circuitry 14, and the image reconstruction and processing circuitry 16 are shown as being outside the detector assembly 12 and the operator workstation 20, in certain other implementations, some or all of these circuitries may be provided as part of the detector assembly 12 and/or the operator workstation 20. Each of the aforementioned components would be discussed in greater detail in the sections that follow.

Keeping in mind the exemplary PET system 10 above, or the corresponding components of other types of nuclear imaging systems, a brief description of the functioning of such a system is provided to facilitate further discussion of the present technique. PET imaging is primarily used to measure metabolic activities that occur in tissues and organs. In particular, PET imaging typically generates functional images of biological and metabolic activity as opposed to structural images generated by imaging modalities such as magnetic resonance imaging (MRI) and computed tomography (CT).

In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits particles known as positrons that interact with and annihilate complementary particles known as electrons to generate gamma rays. In each annihilation reaction, two gamma rays traveling in opposite directions are emitted. In a PET imaging system 10, the pair of gamma rays are detected by the detector assembly 12 configured to ascertain that two gamma rays detected sufficiently close in time are generated by the same annihilation reaction. Due to the nature of the annihilation reaction, the detection of such a pair of gamma rays may be used to determine the line of response along which the gamma rays traveled before impacting the detector, allowing localization of the annihilation event to that line. By detecting a number of such gamma ray pairs, and calculating the corresponding lines traveled by these pairs, the concentration of the radioactive tracer in different parts of the body may be determined and a tumor, thereby, may be detected. Therefore, accurate detection and localization of the gamma rays forms a fundamental and foremost objective of the PET system 10.

In view of these comments, and returning now to FIG. 1, the detector acquisition circuitry 14 is adapted to read out signals generated in response to the gamma rays from the detector modules 18 of the detector assembly 12. The signals acquired by the detector acquisition circuitry 14 are provided to the image reconstruction and processing circuitry 16. The image reconstruction and processing circuitry generates an image based on the derived gamma ray emission locations. The operator workstation 20 is utilized by a system operator to provide control instructions to some or all of the described components and for configuring the various operating parameters that aid in data acquisition and image generation. The operating workstation 20 may also display the generated image. Alternatively, the generated image may be displayed at a remote viewing workstation, such as the image display workstation 22.

Figure 2:
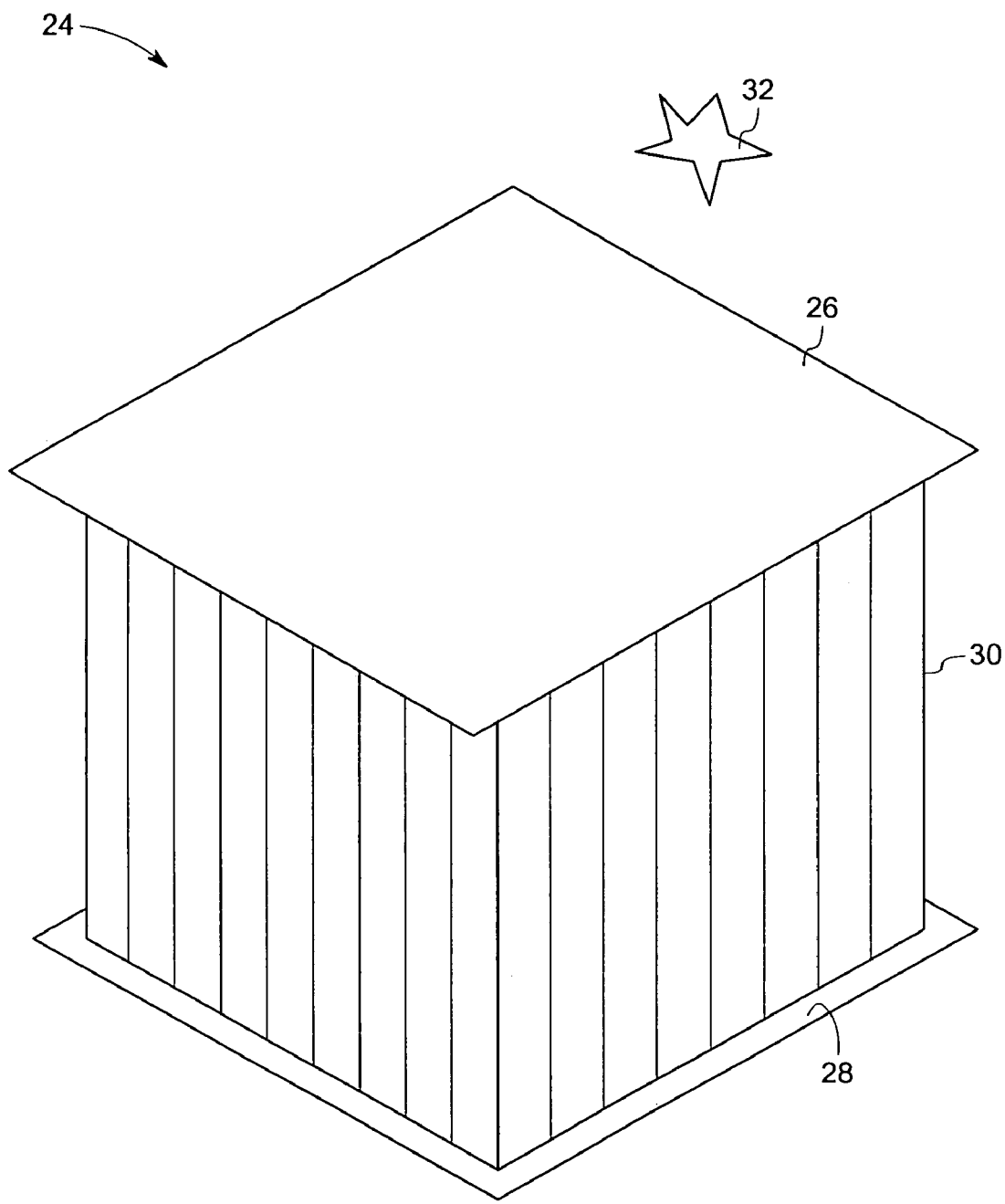
FIG. 2 is a depiction of an exemplary detector module illustrating a top pixellated avalanche photodiode (APD) array and a bottom pixellated APD array, in accordance with one embodiment of the present technique.

Referring now to FIG. 2 an exemplary detector module 24 for use with the system of FIG. 1 is depicted. The exemplary detector module 24 includes a first pixellated APD array 26, a second pixellated APD array 28 and a scintillator array 30. The pixellated APD arrays 26 and 28 are attached to opposite faces of the scintillator array 30. The scintillator array 30 includes an array of scintillator units adapted to generate a plurality of photons when struck by gamma rays emitted from a radiation source 32. Each of the pixellated APD arrays 26, 28 include a two-dimensional arrangement of APDs, each of which generally corresponds to a scintillator unit of the scintillator array 30. In this manner, each pixel generally corresponds to a scintillator unit and the corresponding APDs of the first and second pixellated APD arrays 26, 28 at the ends of the scintillator unit. The photons generated by the scintillator units are detected by the corresponding APDs of the first and the second pixellated APD arrays 26 and 28, allowing the position of gamma ray impacts to be determined. As will be appreciated by a person skilled in the art, using both the first APD array 26 and the second APD array 28 facilitates the resolution of depth-of-interaction (DOI) or parallax errors, thereby improving the spatial resolution of the system. Another advantage provided by the embodiment of FIG. 2 is that fast timing signals may be acquired from both ends of the scintillator array.

In the depicted embodiment of FIG. 2, the first and second pixellated APD arrays 26, 28 are configured to be read out by linear groups of pixels as opposed to pixel-by pixel. In particular, each pixellated APD array provides complementary information to the other such that the combination of the read out information may be used to localize a scintillator unit, i.e., pixel, associated with a gamma ray impact event. For example, the first pixellated APD array 26 may be configured to be read out as columns while the second pixellated APD array 28 may be configured to be read out as rows. In this way, the combination of the data acquired from the first and second pixellated APD arrays 26, 28 can be used to identify a row and a column, which thereby identify a scintillator unit associated with a gamma ray impact. While the sections herein refer to the use of the avalanche photodiode (APD) array, it may be construed only as an example. As will be appreciated by a person skilled in the art, the APD array may be substituted by any other pixellated photodetector to achieve the desired utility.

Figures 3, 4:
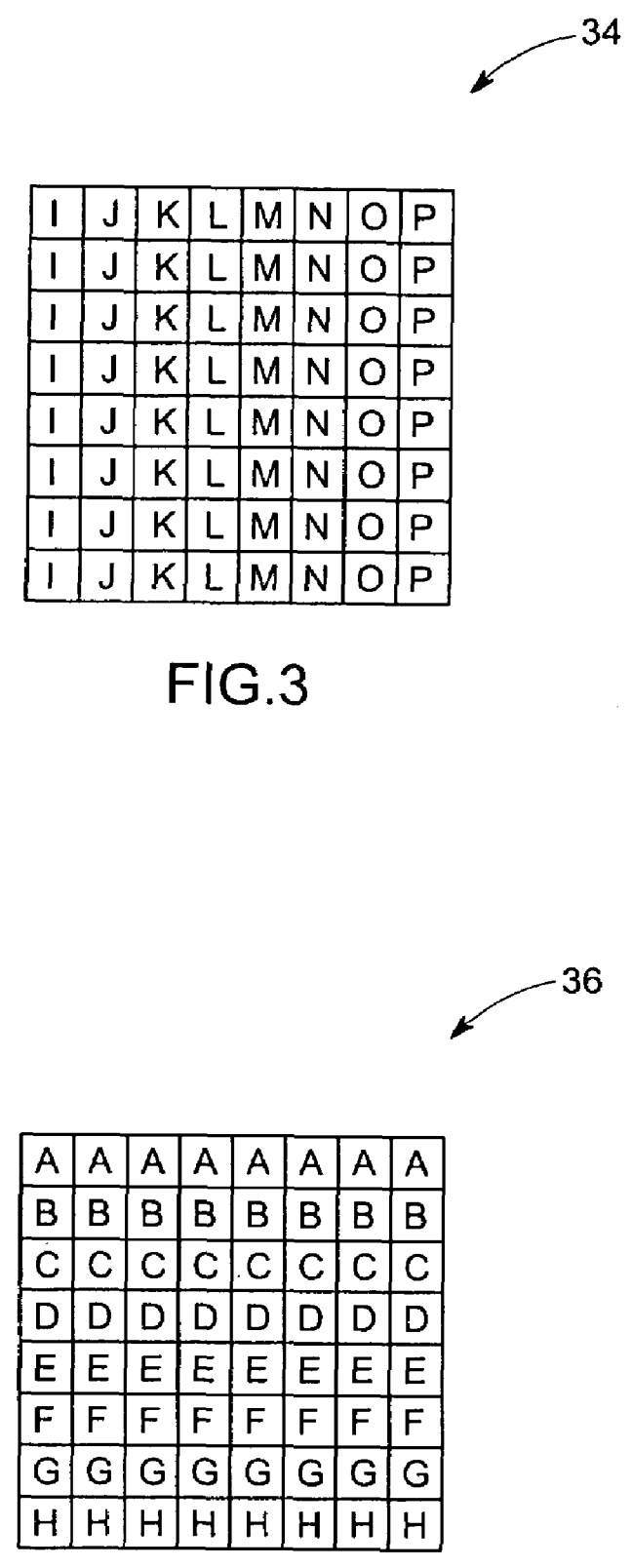

For example, referring now to FIG. 3, an example is provided of an 8×8 pixellated APD array 34 that may be used as one of the pixellated APD arrays of the exemplary detector module 24 of FIG. 2. In the exemplary pixellated APD array depicted in FIG. 3, the individual APD pixels (totaling 64) are linearly grouped, by electrically connecting their outputs, into eight columns that are represented by reference letters I through P. Each of the eight columns forms a single data channel.

FIG. 4 depicts a complementary exemplary 8×8 pixellated APD array 36 that may be used as the other pixellated APD array of the exemplary detector module 24 of FIG. 2. In the exemplary pixellated APD array 36 depicted in FIG. 4, the APD pixels are linearly grouped, by electrically connecting their outputs, into eight rows that are represented by reference letters A through H. Each of the eight rows forms a single data channel. In this manner, using the examples provided in both FIGS. 3 and 4, coordinates in the form of a row and a column may be obtained for each gamma ray impact, allowing the impacted scintillator unit to be identified.

Furthermore, an exemplary detector module having 64 scintillator units in the scintillator array (as illustrated in FIG. 2) and which uses the pixellated APD arrays illustrated in FIG. 3 and FIG. 4 at opposing faces of the scintillator 30, will require only 16 data channels to distinguish each of the 64 scintillator units in the scintillator array 30. As will be appreciated by those of ordinary skill in the art, it is immaterial which of the first or second pixellated APD array 26, 28 is configured to read out rows and which is configured to read out columns so long as one pixellated APD array provides the row information and the other provides the column information. Knowledge of the row and the column associated with an optical event (in this case, the impact of optical photons) may, therefore, be employed to identify the scintillator unit responsible for the generation of the detected optical photons.

While the preceding discussion of FIGS. 2-4 has been in the context of an 8×8 array of pixels, one of ordinary skill in the art will appreciate that the present technique is equally applicable to pixel arrays of other dimensions. In other exemplary implementations, the number of APD pixels may be scaled up or scaled down according to the desired position resolution. In certain other implementations of the present technique, it is also possible to provide an improved timing resolution by combining the signals from the first pixellated APD array 26 and the second pixellated APD 28. The combination of the signals may be achieved by summing in the analog domain before time pick-off, by a simple averaging scheme after digitizing the individual timing information for the two APD arrays, by a weighted averaging scheme in the digital domain, or any other manner known in the art.

Figure 5:
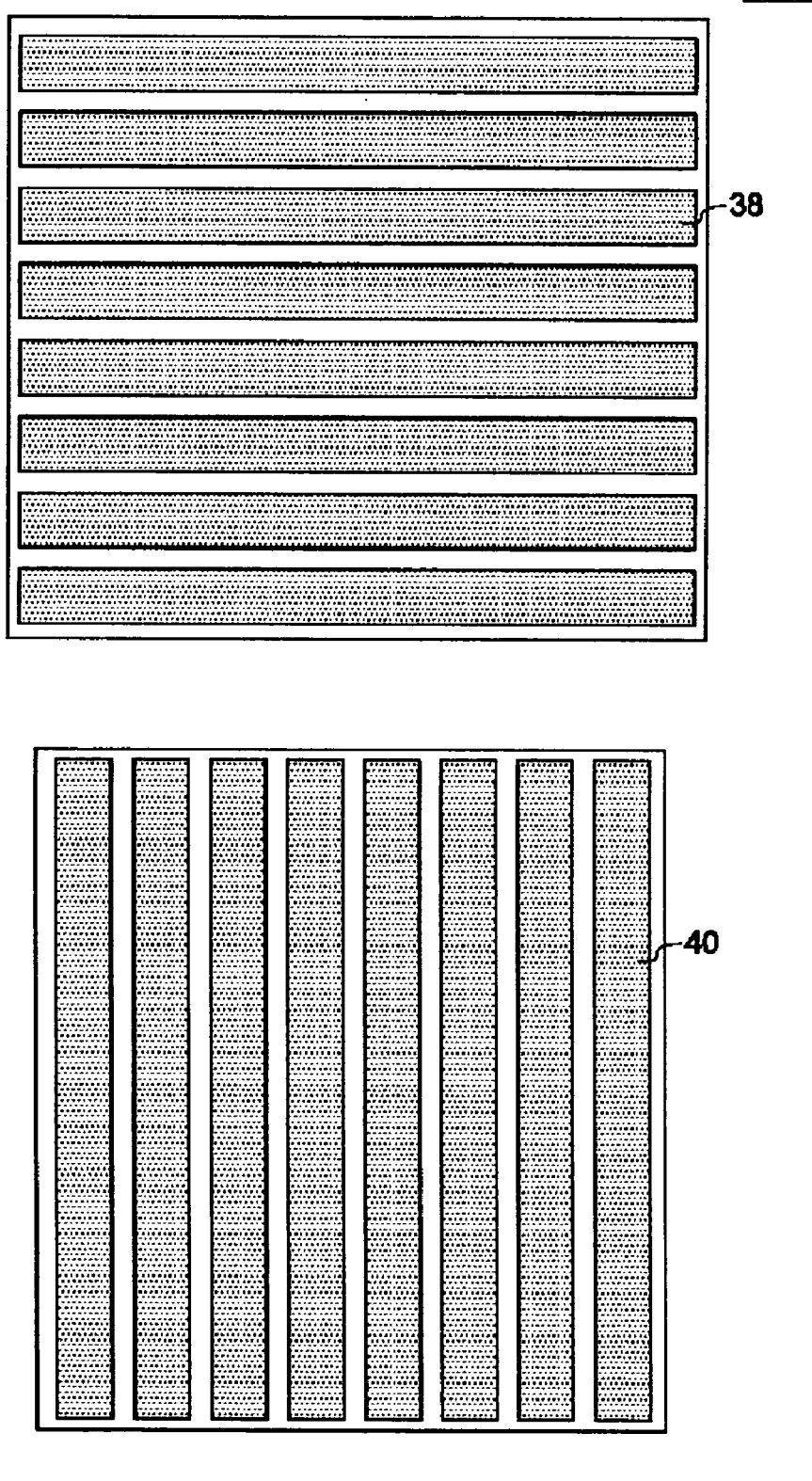
FIG. 5 is an exemplary depiction of a top pixellated APD array and a bottom pixellated APD array for use with the detector module of FIG. 2.

In another embodiment, the pixels of an APD need not be square or sized to correspond to the associated scintillator element. Instead, as depicted in FIG. 5, each readout element may be formed as a linear element corresponding to the linear groupings of pixels discussed previously. The linear readout element may be oriented as a row or a column, as represented by reference numerals 38 and 40 in FIG. 5, and used in accordance with the a detector element 24 in the manner described above with regard to the linear readout groupings of FIGS. 3 and 4. As will be appreciated by a person of ordinary skill in the art, such an arrangement would have minimum dead space in the array and would require only one readout channel per linear readout element. In this manner, therefore, an 8×8 array of scintillator units may be read out with only 16 readout channels, as described above, using complementary linear readout elements at opposing scintillator faces to provide row and column information.

Figure 6:
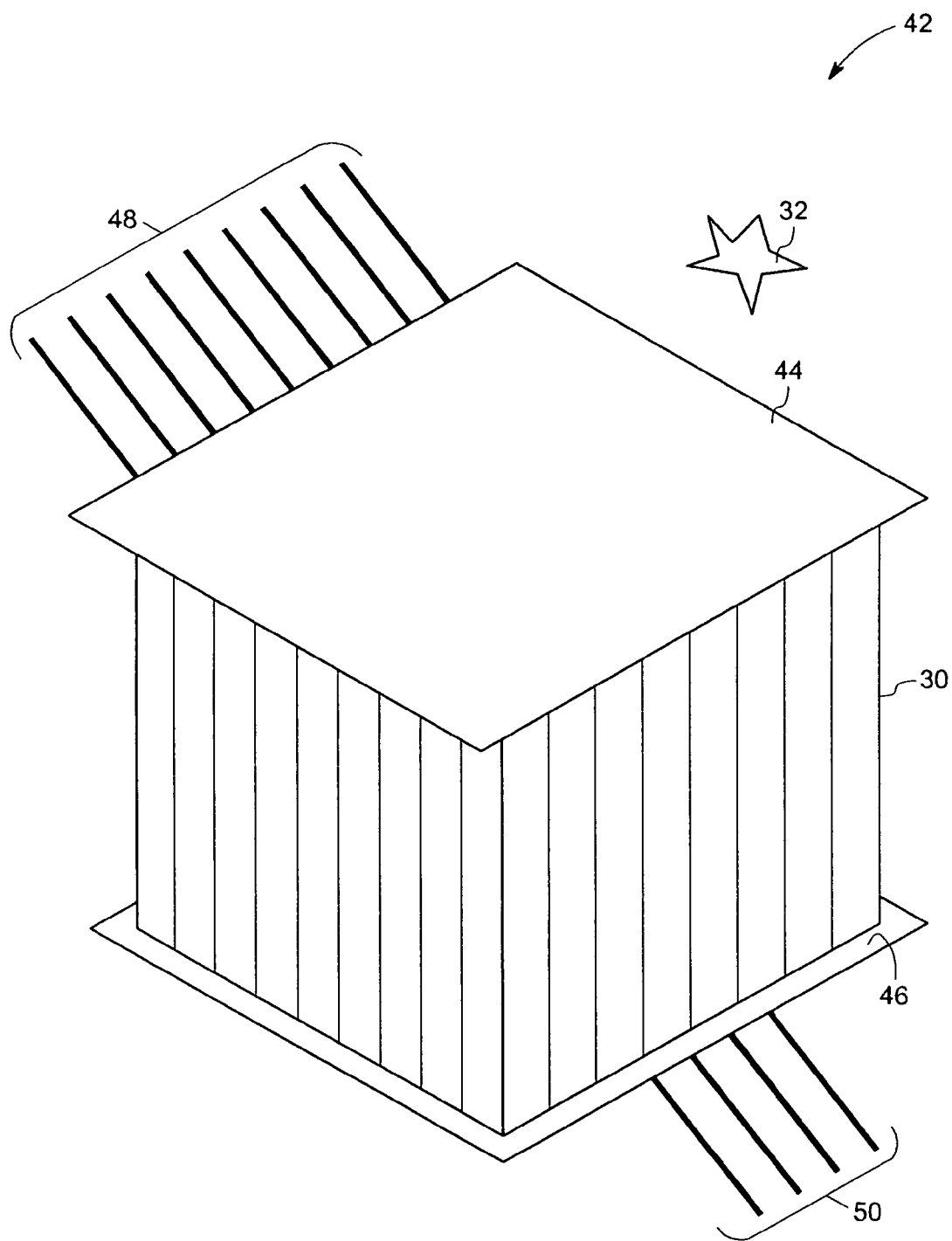
FIG. 6 is a depiction of an exemplary detector module with a top pixellated APD array having 9 data channels and a bottom PSAPD module having 4 data channels, in accordance with one embodiment of the present technique.

Referring now to FIG. 6, an exemplary detector module 42 for use with the system of FIG. 1 is depicted. The detector module 42 includes a pixellated APD array 44, a position sensitive APD (PSAPD) 46 and the scintillator array 30. Similar to the exemplary embodiment illustrated in FIG. 2, each APD pixel in the pixellated APD array 44 corresponds to a scintillator unit in the scintillator array 30. Though in the present discussion the pixellated APD array 44 is described as coupled to the face of the scintillator array 30 closer to the radiation source 32 and the PSAPD 46 is described as coupled to the opposing face of the scintillator array 30, in other embodiments this arrangement may be reversed. In the depicted embodiment, the pixellated APD array 44 has associated with it 9 data channels (represented by reference numeral 48) to facilitate read-out of the data from the pixellated APD array 44. The PSAPD module 46 is a single, large-area APD having four bottom corner contacts leading to four electronic data channels (represented by reference numeral 50). The PSAPD module 46 is read-out in a usual manner associated with reading PSAPDs i.e., using the four bottom corner contacts to derive amplitudes and/or rise times from which an impact position may be determined. While the present embodiment discusses the use of the PSAPD, it may only be construed as an example. In certain other implementations of the present technique, the PSAPD may be replaced by any other position sensitive photodetector, such as a position sensitive photo multiplier tube (PMT).

Figure 7:
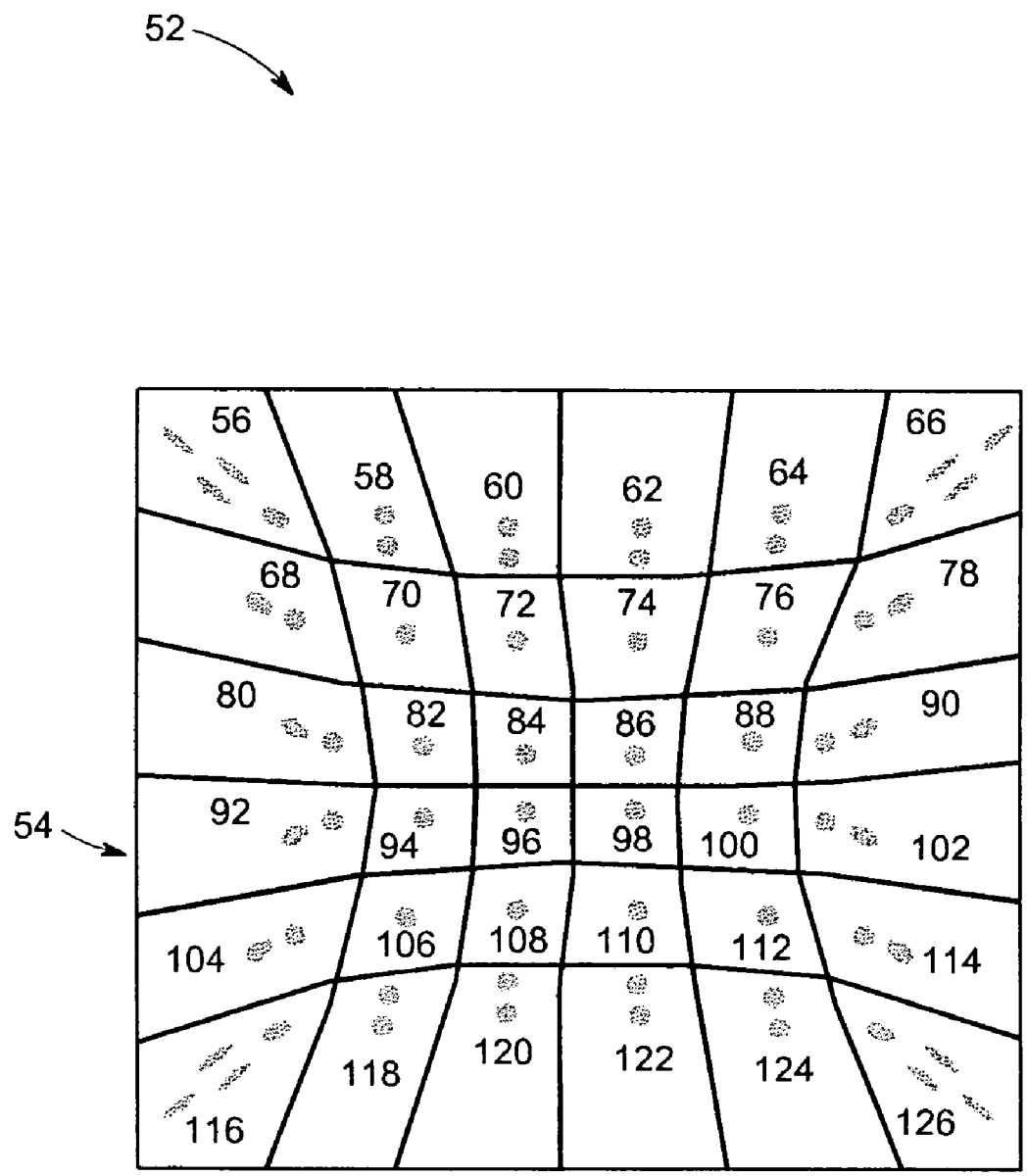
FIG. 7 is an exemplary depiction of a neighborhood scheme for use with the exemplary detector module of FIG. 6.

FIG. 7 graphically illustrates a position map 52 as generated by the PSAPD module 46 coupled to an 8×8 scintillator array 30 in the detector element 42 illustrated in FIG. 6 and how the various regions in the position map are differentiated using an exemplary neighborhood scheme. More particularly, since the pixellated APD array 44 has nine data channels for read-out, the position map of the PSAPD 46 is sub-divided into 36 regions, represented generally by reference numeral 54 and specifically by reference numerals 56 through 126. In this manner, each region of the PSAPD 46 is associated with only one pixel of the pixellated APD array 44 for each readout channel, i.e., nine pixels in the depicted embodiment, each associated with a different readout channel. In other words, the differentiated regions on the PSAPD module 46 may be mapped to corresponding regions in the pixellated APD array 44 which may be differentiated based upon readout channel of each pixel.

Figure 8:
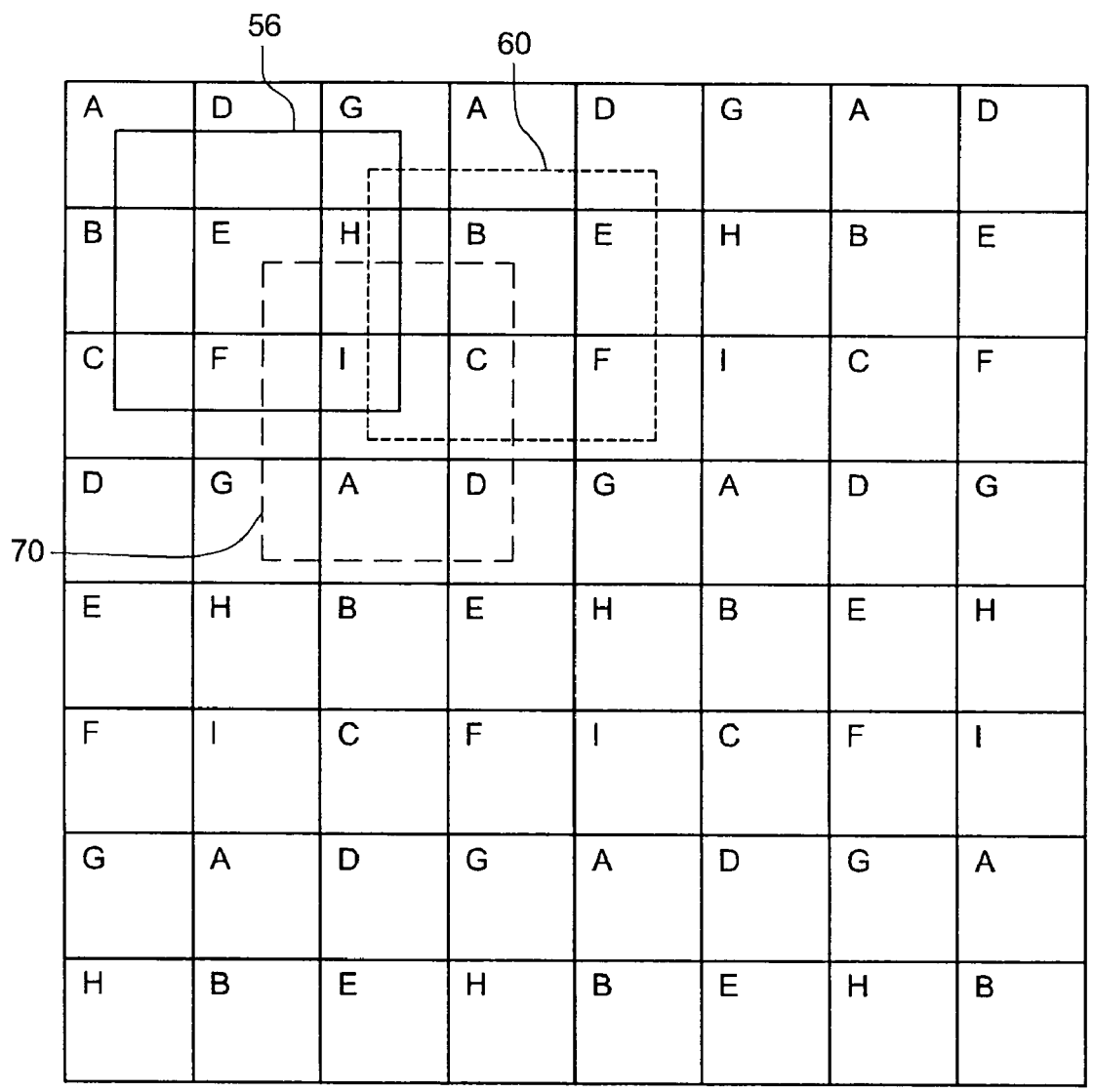
FIG. 8 is a graphical depiction of an exemplary mapping scheme for use with the neighborhood scheme of FIG. 7.

For example, FIG. 8 provides an illustration of how multiple APD pixels in the pixellated APD array 44 in the detector element 42 (illustrated in FIG. 6) are mapped with respect to the corresponding regions in the PSAPD module 46, as illustrated in FIG. 7. As specified earlier, the pixellated APD array 44 has nine data channels for read-out. Each APD pixel is assigned one of nine possible data channels, as indicated by reference letters A though I, such that no adjacent pixels are assigned to the same data channel.

FIG. 8 further illustrates how the regions 56, 60 and 70 in the PSAPD module 46 (as illustrated in FIG. 7) are mapped on to corresponding regions on the pixellated APD array 44. In the depicted embodiment, each region from the PSAPD module 46 encompasses regions of nine APD pixels of the pixellated APD array 44 such that each data channel of the pixellated APD is represented once. In addition, it should be noticed that there may be an overlap between the regions 56, 60 and 70 when mapped on to the corresponding APD pixels, as depicted in FIG. 8. This allows for a case where there is an occurrence of a misplacement of an event in two neighboring regions. For example, an event detected in region 56 of the PSAPD 46 and at data channel E of the pixellated APD 44 would correspond to the same scintillator crystal as an event detected in region 70 of the PSAPD 46 and at data channel E of the pixellated APD 44. Conversely, an event detected in region 56 of the PSAPD 46 and at data channel A of the pixellated APD 44 would not correspond to the same scintillator unit as an event detected in region 60 of the PSAPD 46 and at data channel A of the pixellated APD 44. In this manner, by using a combination of the information provided by the PSAPD module 46 and the pixellated APD 44, impact events may be associated with the appropriate scintillator unit without individually reading out each pixel of the pixellated APD 44. While FIG. 8 only illustrates a partial mapping of the APD pixels with respect to the region or neighborhood of the PSAPD 46, it should be considered that the remainder of the APD pixels in the pixellated APD array 44 are mapped in a similar manner.

As will be appreciated by a person skilled in the art, when a gamma ray strikes a particular scintillator unit to generate optical photons in an exemplary detector element 18 in the embodiment described by FIGS. 6-8, the optical photons strike both the pixellated APD array 44 and the PSAPD module 46. While the PSAPD 46 provides information on a specific region or neighborhood where the impact occurred, the pixellated APD array 44 provides a more detailed and accurate information on which scintillator unit in the scintillator array 30 caused the emission of the optical photons after the correct region or neighborhood has been identified. Typically, this may be done by comparing the signal levels from each of the nine data channels. The data channel that has the maximum signal level compared to the rest of the eight data channels indicates the corresponding scintillator unit that caused the emission of optical photons.

Figure 9:
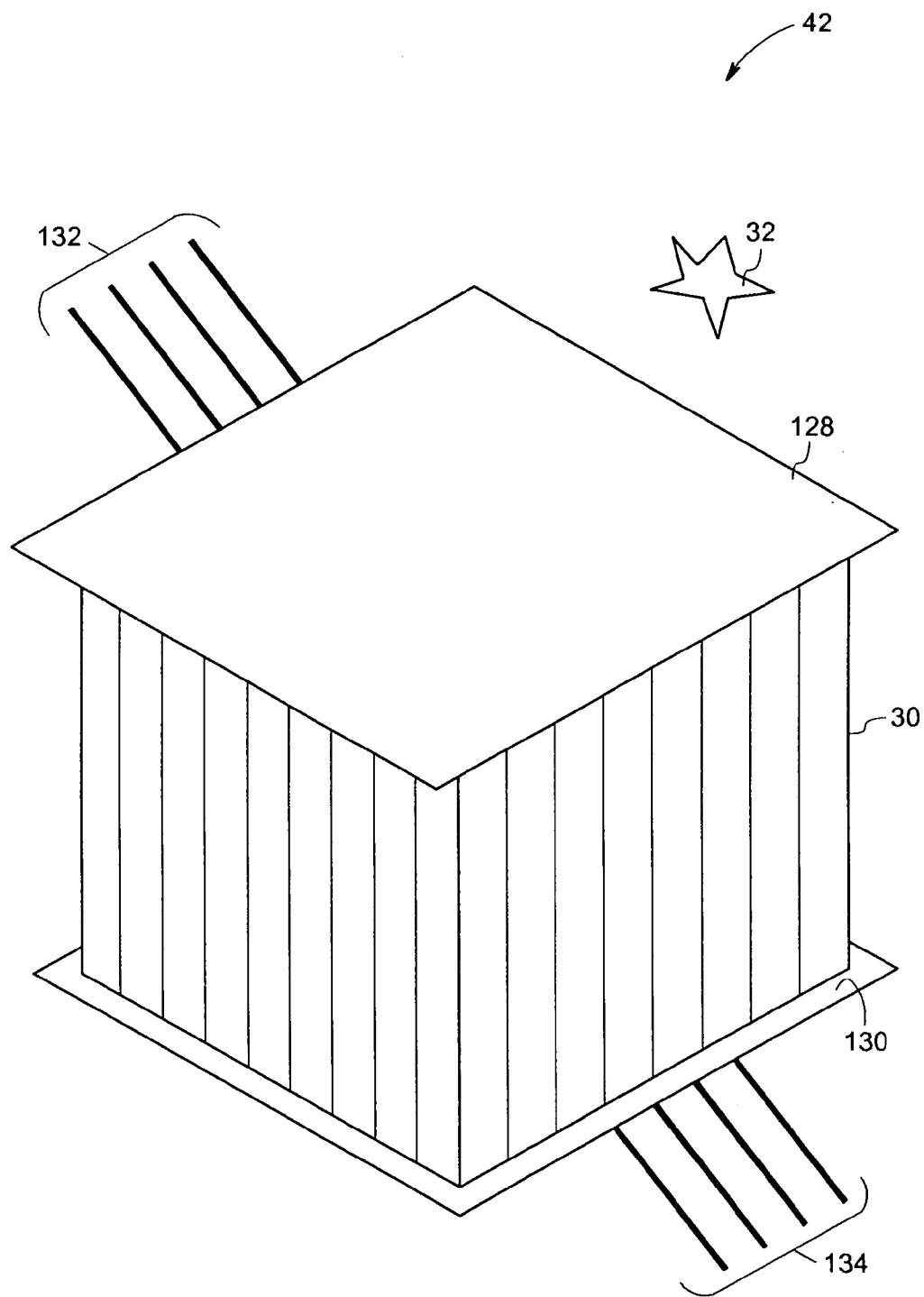
FIG. 9 is a depiction of an exemplary detector module with a top pixellated APD array having 4 data channels and a bottom PSAPD module having 4 data channels, in accordance with one embodiment of the present technique.

Referring now to FIG. 9, another embodiment of the detector module 42 is provided using a pixellated APD array 128 and a position sensitive APD (PSAPD) module 130 attached to the scintillator array 30 having a plurality of scintillator units. As in the previous exemplary embodiments, each APD pixel in the pixellated APD array 128 corresponds to a scintillator unit in the scintillator array 30. Likewise, though in the present discussion the pixellated APD array 128 is described as coupled to the face of the scintillator array 30 closer to the radiation source 32 and the PSAPD 130 is described as coupled to the opposing face, in other embodiments this arrangement may be reversed. In the depicted embodiment of FIG. 9, the pixellated APD array 128 is read out using four data channels (represented by reference numeral 132). The PSAPD 130 having four data channels (represented by reference numeral 134) is similar to the bottom PSAPD 46 illustrated in FIG. 6 and explained previously.

Figure 10:
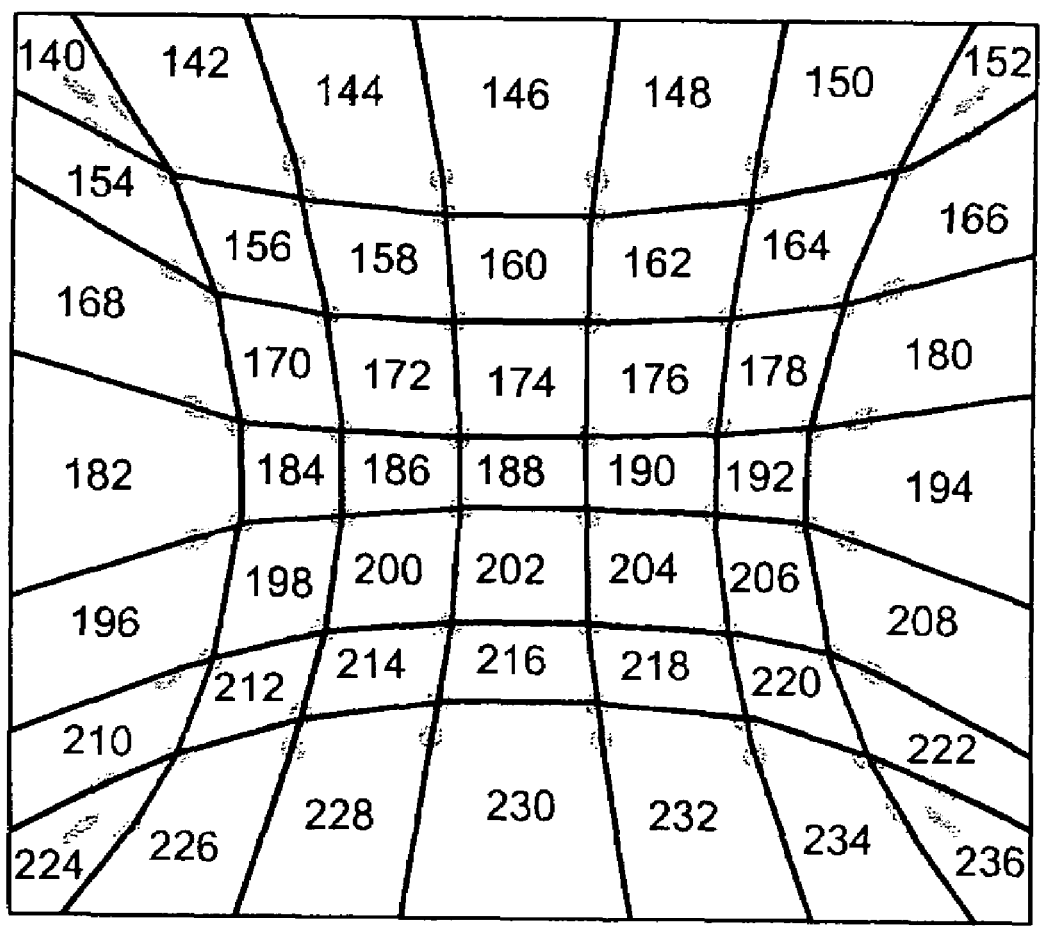
FIG. 10 is an exemplary depiction of a neighborhood scheme for use with the exemplary detector module of FIG. 9.

FIG. 10 graphically illustrates a position map 136 as generated by the PSAPD 130 in the embodiment of the detector element 42 illustrated in FIG. 9 and how the various regions in the position map are differentiated using an exemplary neighborhood scheme. More particularly, since the pixellated APD array 128 has only four data channels for read-out, the position map of the PSAPD 130 is sub-divided into 49 regions, represented generally by reference numeral 138 and specifically by reference numerals 140 through 236. As previously described, each region defined on the PSAPD 130 corresponds to respective set of four pixels on the pixellated APD array 128 such that each of the four data channels is represented in the four pixels associated with a region of the PSAPD 130.

Figure 11:
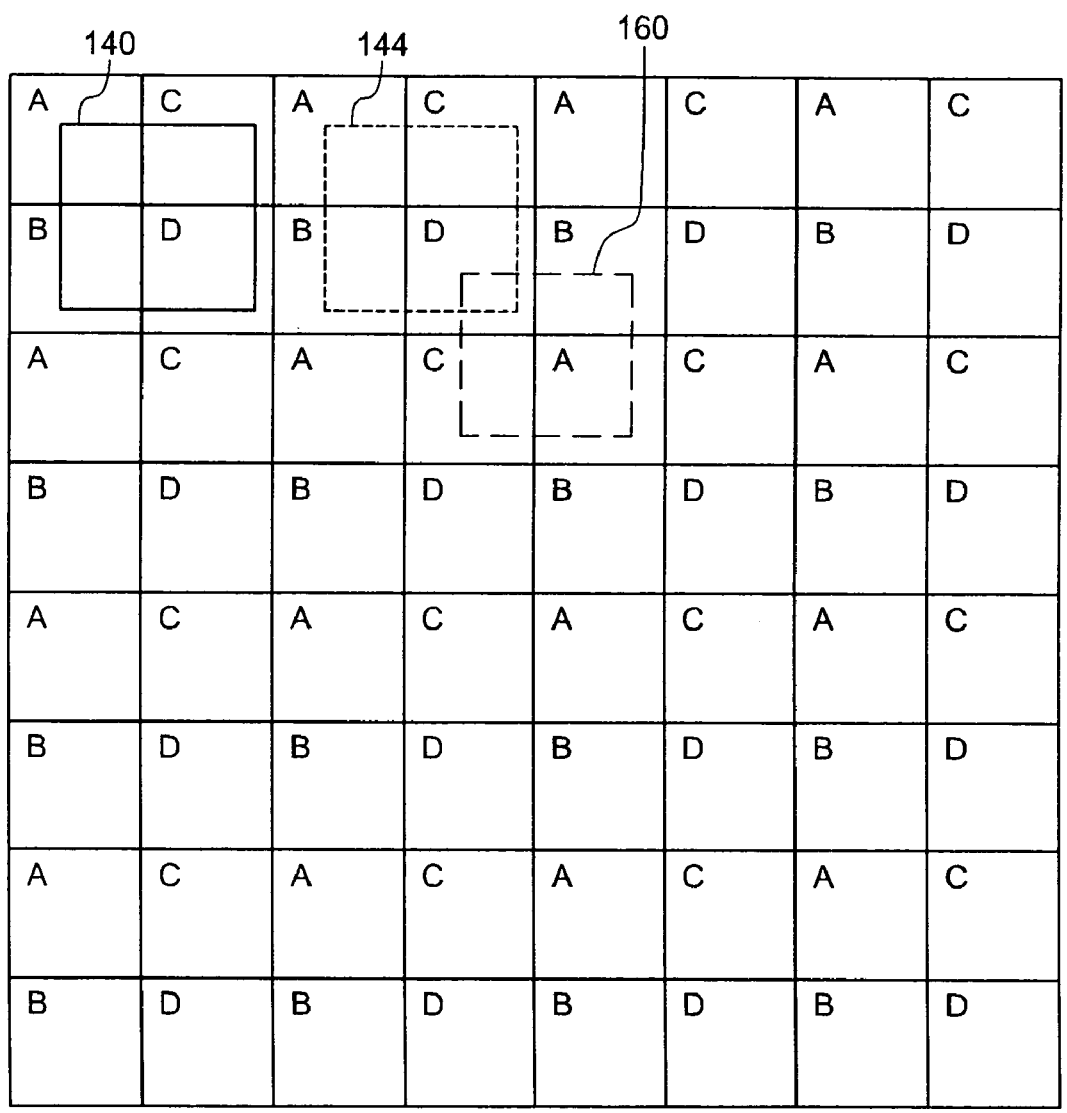
FIG. 11 is a graphical depiction of an exemplary mapping scheme for use with the neighborhood scheme of FIG. 10.

FIG. 11 provides an illustration of how multiple APD pixels in the pixellated APD array 128 in the detector element 42 illustrated in FIG. 9 are mapped with respect to the corresponding regions in the PSAPD module 130 as illustrated in FIG. 10. As specified above, the pixellated APD array 128 has four data channels for read-out in the depicted embodiment. Each APD pixel within a region corresponding to the region 140 (illustrated in FIG. 10) in the PSAPD 130 is assigned one of four possible data channels as indicated by reference letters A through D. This assignment of data channels to individual APD pixels is replicated throughout the pixellated APD array 108.

FIG. 11 further illustrates how the regions 140, 144, and 160 in the position map generated by PSAPD 130 (as illustrated in FIG. 10) are mapped on to corresponding regions on the pixellated APD array 128. It should be noticed that each region from the PSAPD 130 encompasses regions of four APD pixels in the pixellated APD array 128, with each of the four pixels connected to different electronic channels. More particularly, it should be noticed that there may be an overlap between the regions when mapped on to the corresponding APD pixels. For example, an event detected in region 144 of the PSAPD 130 and at data channel D of the pixellated APD array 128 would correspond to the same scintillator unit as an event detected in region 160 of the PSAPD 130 and at data channel D of the pixellated APD 128. Conversely, an event detected in region 140 of the PSAPD 130 and at data channel A of the pixellated APD 128 would not correspond to the same scintillator unit as an event detected in region 144 of the PSAPD 130 and at data channel A of the pixellated APD array 128. In this manner, by using a combination of the information provided by the PSAPD 130 and the pixellated APD array 128, impact events may be associated with the appropriate scintillator crystal without individually reading out each pixel of the pixellated APD array 128. While FIG. 11 only illustrates a partial mapping of the APD pixels in the pixellated APD array 128 with respect to the neighborhood of the PSAPD 130, it should be considered that the remainder of the APD pixels are mapped in a similar manner. As will be appreciated by those of ordinary skill in the art, the examples discussed herein are merely intended to provide insight into the broader concepts described. For example, the number of data channels used to read out an APD in accordance with the present technique may differ from the examples described herein and still fall within the scope of this invention.

As will be appreciated by a person skilled in the art, the various implementations of the present technique provide for a variety of advantages. For example, the present technique involves the use of fewer data channels to facilitate readout as compared to the number of scintillator units in the scintillator array. Secondly, when compared with techniques that use two PSAPDs to readout the scintillator array, the present technique provides an improvement in the timing resolution. More particularly, by replacing at least one of the PSAPDs with the pixellated APD array, the series resistance of the detector module can be reduced. Also, the use of the pixellated APD array results in reduced capacitance and leakage currents in each of the data channels in the pixellated APD array. This reduction in capacitance and leakage current leads to an improvement in the timing resolution. Further, by reducing the number of readout channels, the detrimental aspects, such as increased cost, power consumption, heat dissipation, associated with the readout channels are also reduced. The various implementations described herein provide different degrees of improvement in the timing resolution due to trade-offs between the timing resolution and the number of data channels for readout. The present technique, further, facilitates a reduction or elimination of the timing resolution variation across the scintillator array that is often present in systems that only use PSAPDs to readout both ends of the scintillator crystals. In addition, another advantage of the present technique is the ability for improved DOI determination and energy resolution on account of higher signal-to-noise ratio of APD data channels.

Moreover, in implementations that use a pixellated APD array and a PSAPD in the detector module where the PSAPD is only used to identify a "neighborhood" of scintillator units, the PSAPD provides sufficient accuracy at higher temperatures than might normally be acceptable. In particular, for PSAPDs, noise typically increases with temperature. However, since the PSAPD is only identifying a "region" of scintillator units and not a specific scintillator unit, the reduced accuracy associated with higher temperatures may be more easily tolerated. In particular, the ability of the pixellated APD array to refine the position estimate will not be as temperature sensitive as the position resolution of a PSAPD, thus allowing individual scintillator units to be distinguished.

While in the discussions hereinabove, embodiments of the present technique have been illustrated and described with the pixellated APD array being exposed to the gamma radiation directly and the PSAPD being indirectly exposed to the gamma radiation, it would be possible in other implementations to have the PSAPD directly exposed to the gamma radiation and the pixellated APD array being indirectly exposed to the gamma radiation. Also, the present technique should not be limited to the use of only the avalanche photodiode (APD) as the photosensor or the photodetector. Other types of photodiodes or photomultiplier tubes may also be effectively used to achieve the desired utility. Similarly, the pixellated APD array may be substituted with any other pixellated photodetector to achieve the desired utility.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for identifying localized optical emission, comprising:
    identifying a region on a position sensitive photodetector impacted by one or more photons, wherein the region corresponds to a plurality of scintillator units of a scintillator;
    identifying a readout channel of a pixellated photodetector corresponding to an APD pixel associated with a scintillator unit impacted by the one or more photons; and
    identifying the scintillator unit based on the region and the readout channel.

2. The method as recited in claim 1, wherein the position sensitive photodetector comprises a position sensitive avalanche photodiode (PSAPD), or position sensitive photo multiplier tube.

3. The method as recited in claim 1, wherein the pixellated photodetector comprises a pixellated avalanche photodiode (APD) array comprising an array of APD pixels.

4. The method as recited in claim 3, wherein adjacent APD pixels of the pixellated APD array have different readout channels.

5. The method as recited in claim 1, wherein identifying the scintillator unit from the region and the readout channel is based on at least a weighted average scheme or a simple averaging scheme.

6. The method as recited in claim 1, comprising determining a position map based on the impact of the one or more photons on the position sensitive photodetector.

7. The method as recited in claim 6, comprising dividing the position map into a plurality of regions based on a neighborhood scheme.

8. The method as recited in claim 1, wherein identifying the scintillator unit is based on a maximum signal strength.

9. The method as recited in claim 1, comprising determining a depth of interaction within the scintillator unit based on relative signal levels detected in the position sensitive photodiode and the pixellated photodetector.

10. A detector, comprising:
    a scintillator array comprising two or more scintillator units configured to emit optical photons in response to radiation;
    a pixellated photodiode array comprising a corresponding photodiode for each of the scintillator units, wherein the pixellated photodiode array is affixed to a first surface of the scintillator array; and
    a position sensitive avalanche photodiode affixed to a second surface of the scintillator array opposite the first surface.

11. The detector as recited in claim 10, comprising a plurality of readout channels for reading out the pixellated photodiode array.

12. The detector as recited in claim 11, wherein the number of readout channels is less than the number of photodiodes.

13. The detector as recited in claim 11, wherein the plurality of readout channels is four or nine.

14. The detector as recited in claim 10, wherein the pixellated photodiode array comprises an array of avalanche photodiodes.

15. An imaging system, comprising:
    a detector assembly comprising an array of detector modules configured to detect radiation, each detector module comprising:
        a scintillator array comprising two or more scintillator units configured to emit optical photons in response to radiation;
        a pixellated photodiode array comprising a corresponding photodiode for each of the scintillator units, wherein the pixellated photodiode array is affixed to a first surface of the scintillator array; and
        a position sensitive avalanche photodiode affixed to a second surface of the scintillator array opposite the first surface.

16. The imaging system as recited in claim 15, wherein the pixellated photodiode array comprises an array of avalanche photodiodes.

17. The imaging system as recited in claim 15, further comprising data acquisition circuitry configured to acquire impact positions from the pixellated avalanche photodiode array and the position sensitive avalanche photodiode.

18. The imaging system as recited in claim 17, further comprising image reconstruction and processing circuitry configured to process the impact positions acquired by the data acquisition circuitry and to generate an image signal based on the impact positions.

19. The imaging system as recited in claim 15, comprising a plurality of readout channels for reading out the pixellated avalanche photodiode array, wherein the number of readout channels is less than the number of photodiodes.

20. A method of manufacturing a detector module, comprising:
   attaching a position sensitive avalanche photodiode to a first surface of a scintillator array; and
   attaching a pixellated avalanche photodiode array to a second surface of the scintillator array, wherein the second surface is opposite the first surface on the scintillator array.

21. The method as recited in claim 20, comprising providing a plurality of readout channels to the position sensitive avalanche photodiode.

22. The method as recited in claim 20, comprising providing a plurality of readout channels to the pixellated photodiode array, wherein number of readout channels in the pixellated photodiode array is less than number of photodiodes in the pixellated photodiode array.

* * * * *